US005222213A

United States Patent [19]

Petty

[11] Patent Number: 5,222,213

[45] Date of Patent: Jun. 22, 1993

[54] LOW-COST DISPLAY CONTROLLER COMPRISING A DMA OR COMMUNICATIONS CONTROLLER OPERATING UNDER PROCESSOR CONTROL

[75] Inventor: Norman W. Petty, Boulder, Colo.

[73] Assignee: AT&T Bell Laboratories, Murray Hill, N.J.

[21] Appl. No.: 507,699

[22] Filed: Apr. 10, 1990

[51] Int. Cl.[5] ............................................ G06F 15/20

[52] U.S. Cl. .................................. 395/164; 395/162; 395/163

[58] Field of Search ................................ 395/162–164

[56] References Cited

U.S. PATENT DOCUMENTS 4,204,208 5/1980 McCarthy ....................... 395/151 X 4,486,856 12/1984 Heckel et al. .................. 395/100 X

*Primary Examiner*—Dale M. Shaw

*Assistant Examiner*—Kee M. Tung

*Attorney, Agent, or Firm*—David Volejnicek

[57] ABSTRACT

A DMA or communications controller, such as a DMA serial controller, operating under control of, and in cooperation with, a microprocessor together perform the functions of, and hence replace, a bit-mapped display controller, thereby avoiding the cost of the display controller. The microprocessor is programmed to cause the DMA or communications controller to transfer image data to a display, like the display controller. Under the processor's repeated commands, the communications controller transfers data representative of an image from a memory to the display a line of a frame of the image at a time. The processor generates control signals, such as horizontal and vertical sync signals, to cause the display to display the image represented by the transferred data.

23 Claims, 4 Drawing Sheets

LOW-COST DISPLAY CONTROLLER COMPRISING A DMA OR COMMUNICATIONS CONTROLLER OPERATING UNDER PROCESSOR CONTROL

TECHNICAL FIELD

This invention relates generally to controllers for alphanumeric and graphic displays, and specifically to implementation of such controllers in microprocessor-controlled communication devices.

BACKGROUND OF THE INVENTION

A display controller effects the generation of a visual graphic or alphanumeric image on a display "screen" in response to external input of information. The display can take any desirable form, such as a CRT, an LCD, or a gas plasma panel. A typical controller automatically repeatedly retrieves from memory image data that has been input and stored therein by external circuitry and uses the retrieved image data to automatically form and refresh the image on the display "screen." A controller for a bit-mapped display fetches from memory the patterns for each dot on a line of the display and sends it to the display; at the end of a line automatically generates a horizontal sync or latch pulse; repeats these two steps for each line automatically, i.e., without external stimulus; and at the end of the last line automatically generates a vertical sync or frame restart pulse and then starts the process all over again.

A display controller may constitute a significant portion of the cost of equipment that includes the display and its controller, such as a telecommunications terminal. From a competitive standpoint, it is therefore desirable to implement the controller as inexpensively as possible.

SUMMARY OF THE INVENTION

Many types of equipment that have displays, such as telecommunications terminals and personal computers, include processors for controlling their operation and also include direct memory access (DMA) or communications controllers. Such a controller respond to each external "transmit" command by taking a specified amount of data, (e.g., a byte, a block, or words within a given address range) from a memory or a processor and transferring it once to processor peripheral equipment, or vice versa. Because controller functions typically come in dual and quad increments, i.e., in unitary circuit packages of two or four controllers, there is often a spare, unused, DMA or communications controller in such equipment. While such controllers fetch information from memory to be sent on communications channels or to some other circuits, they do not generate the control signals required by a display, such as horizontal and vertical synchronization signals, nor do they automatically repeat their operation but rely on an external stimulus to perform repetitive transfers. Hence, they cannot normally be used to perform display control functions. However, I have recognized that a processor and a DMA or communications controller (such as a spare DMA serial controller), operating under the processor's control and with little or no additional circuitry, may be caused to operate as a display controller. The need for a separate display controller is thereby eliminated, as is the cost of that display controller. By using a spare DMA or communications controller that would otherwise go unused, in conjunction with a processor that is already provided to perform other functions, the display control function is obtained essentially for free. This serves to significantly reduce the cost of equipment that includes a display.

According to the invention, a display arrangement comprises a display, a memory for storing data representative of an image to be displayed on the display, a DMA or communications controller coupling the memory to the display instead of a display controller, and a programmable processor connected to the controller. The processor is programmed to repeatedly cause the DMA or communications controller to transfer data from the memory to the display, and repeatedly generates signals, such as synchronization signals, to cause the display to display the image represented by the transferred data. Thus, the processor and the DMA or communications controller together perform for the display the functions of a display controller.

Illustratively, the memory stores data that represent the one or more lines of an image frame to be displayed on the display. The communications controller comprises means for retrieving data from the memory, a first output port connected to the retrieving means for transmitting the retrieved data as a bit-serial data stream to a data imput port of the display, a second output port for transmitting a bit-clock signal stream to a clock input port of the display in parallel with the bit-serial data stream when retrieved data are being transmitted at the first output port, a third output port for transmitting a signal to a first, e.g., horizontal, sync input port of the display, and, for a multi-line display, a fourth output port for transmitting a signal to a vertical sync input port of the display. And the programmable processor is programmed a) to cause the communications controller to periodically retrieve from memory and transmit at the first output port data representing a line of the image frame, b) to cause the third port to transmit a horizontal sync signal following each transmission by the first port of data representing a line of the image frame, and, for a multi-line display, c) to cause the fourth port to transmit a vertical sync signal following transmission by the first port of data representing a last line of the image frame. The communications controller together with, and under control of, the processor performs all of the functions required of a display controller.

These and other advantages and features of the present invention will become more apparent from the following discussion of an illustrative embodiment of the invention taken together with the drawing.

DETAILED DESCRIPTION

Figure 1:
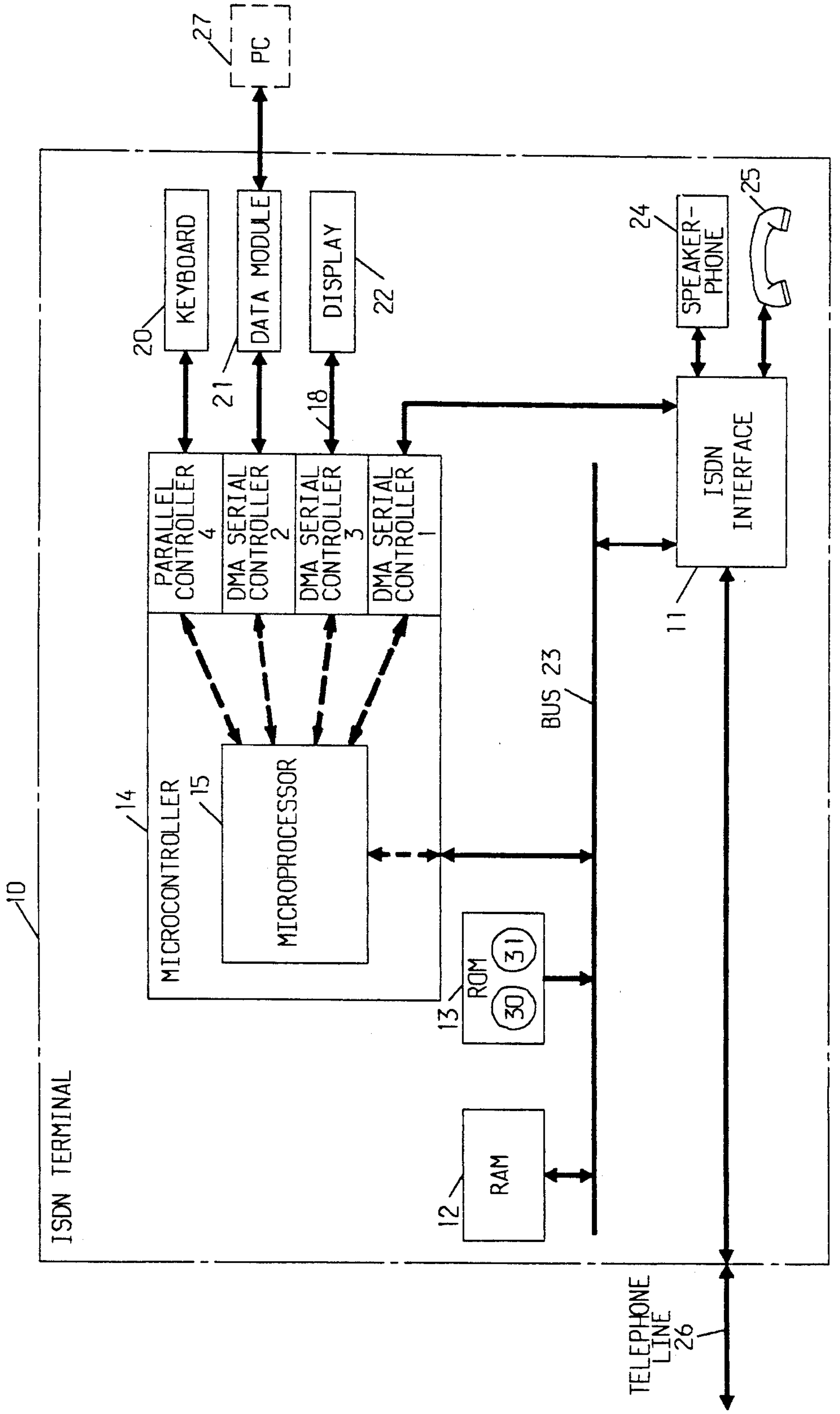
FIG. 1 is a block diagram of a telecommunication terminal that includes an illustrative embodiment of the invention.

FIG. 1 shows an ISDN telecommunications terminal 10. Terminal 10 is connected to an ISDN telephone line 26 by an ISDN interface 11. Interface 11 is illustratively the AMD 79C 30A DSC. For voice communications, interface 11 couples a speakerphone 24 and a telephone handset 25 to telephone line 26. For data communications, interface 11 couples a DMA serial controller 1 to telephone line 26. And for control communications, interface 11 couples a conventional microprocessor bus 23 to telephone line 26. Also connected to bus 23 are a microcontroller 14, and a conventional RAM 12 and ROM 13 for use by microcontroller 14. Microcontroller 14 is illustratively the Motorola 68302 microcontroller. Logically, it includes a microprocessor 15, and a plurality of communication interface controllers 1-3 and a parallel controller 4 operating under control of microprocessor 15. Microprocessor 15 is the central intelligence in control of the operation of terminal 10. A parallel controller 4 interfaces microprocessor 15 with a keyboard 20. A DMA serial controller 2 interfaces microprocessor 15 with a data module 21. The function of module 21 is to connect an external data device, such as a personal computer 27, to terminal 10. And, as noted above, DMA serial controller 1 interfaces microprocessor 15 with ISDN interface 11. These are all the DMA and communications controllers that terminal 10 conventionally needs. However, microcontroller 14 includes an additional DMA serial controller 3, hitherto unused.

As described so far, ISDN terminal 10 is conventional in both structure and operation. However, according to the invention, the spare DMA serial controller 3 is connected to a conventional bit-mapped terminal display 22 via an interconnection 18, and operates as a display controller of display 22 under control of, and in conjunction with, microprocessor 15. Display 22 is any suitable bit-mapped display, such as the Optrex DMF 608N display or the Sharp LM 24013W display.

Figure 2:
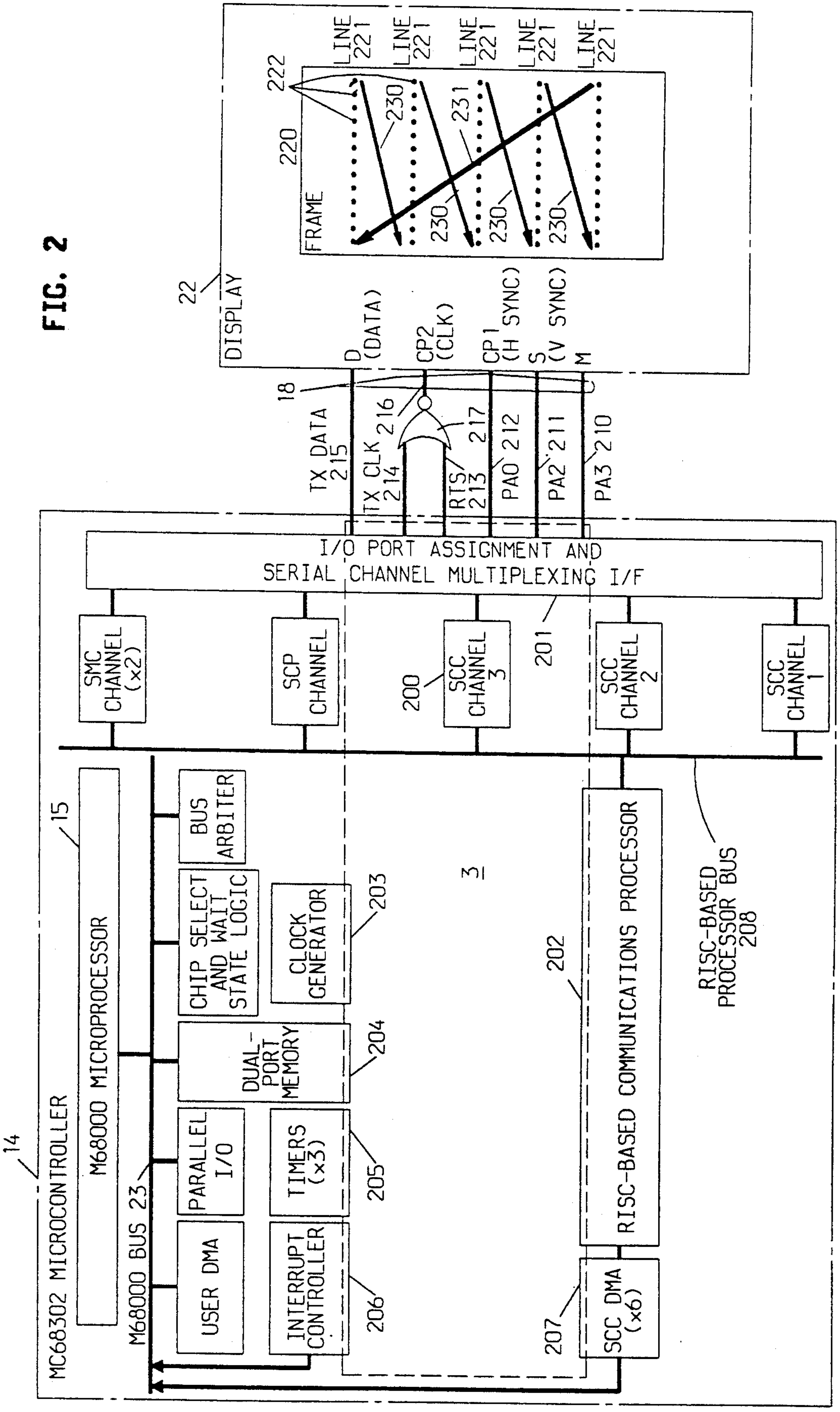
FIG. 2 is a diagram of the interconnection between a microcontroller with a built-in serial controller and the display of the terminal of FIG. 1.

Turning to FIG. 2, it shows the internal physical configuration of microcontroller 14, the operational characteristics of display 22, and interconnection 18 between controller 3 and display 22. Microcontroller 14 includes a plurality of conventional elements, including interface (I/F) 201, processor 202, clock generator 203, memory 204, timers 205, interrupt controller 206, DMA 207, and processor bus 208, which are shared by controllers 1-4 on a time-share basis. Each controller 1-4 has its own channel. Channel 200 and time-share portions of elements 201-208 together make up DMA serial controller 3.

Interconnection 18 comprises six signal leads 210–215 extending from interface 201. They are the leads which respectively carry the PA3, PA2, PA0, RTS, T×CLK, and T×DATA signals of DMA serial controller 3. From the viewpoint of display 22, leads 210–212 respectively carry the M, S, and CP1 signals; lead 215 carries the D signal; and the signals on leads 213 and 214 are combined by a NOR-function gate 217 to produce the CP2 signal on a single lead 216 of display 22. The T×DATA or D signals are a serial data stream representing the bit values of display 22 pixels 222. This data stream is an unformatted, i.e., raw data, stream of RAM 12 memory contents, produced by controller 3 operating in the conventional transparent mode. The T×CLK signals are a constant clock signal stream of one clock pulse to each data bit of the T×DATA stream. They are inverted by gate 217 to produce the data clock signals CP2 for display 22. In order to produce the appropriate rate of display data signals D and data clock signals CP2 for display 22, T×DATA and T×CLK signals are programmed for an 800 Kbps rate in this example. The RTS signal is the EIA ready-to-send signal. It is active-low when real, as opposed to idle, data make up the T×DATA signal stream. At gate 217, the RTS signal controls the T×CLK signal stream to produce a data clock signal CP2 for display 22 only when real data make up the display data stream D. The PA0, PA2, and PA3 signal leads 210–212 are three leads of a 32-bit programmable parallel port A of interface 201. Lead 212 carries the horizontal synchronization (H SYNC), or data latch, signals CP1 that indicate to display 22 the start of a new display line 221. H SYNC signals cause a display data input position pointer of display 22 to undergo transitions designated by numeral 230. Lead 211 carries the vertical synchronization (V SYNC), or frame, signals S that indicate to display 22 the start of a new display frame 220, i.e., the start of a display refresh cycle. V SYNC signals cause the display data input position pointer of display 22 to undergo the transition designated by numeral 231. And lead 210 carries A.C. display-drive signals M which alternate in polarity with every frame.

Generation by controller 3 of the appropriate signals for display 22 on leads 210–216 is accomplished under the control of microprocessor 15 executing microcode routines 30 and 31; these are stored in, and are obtained by microprocessor 15 from, ROM 13. The operational characteristics of routines 30 and 31 are flowcharted in FIGS. 3 and 4.

Figure 3:
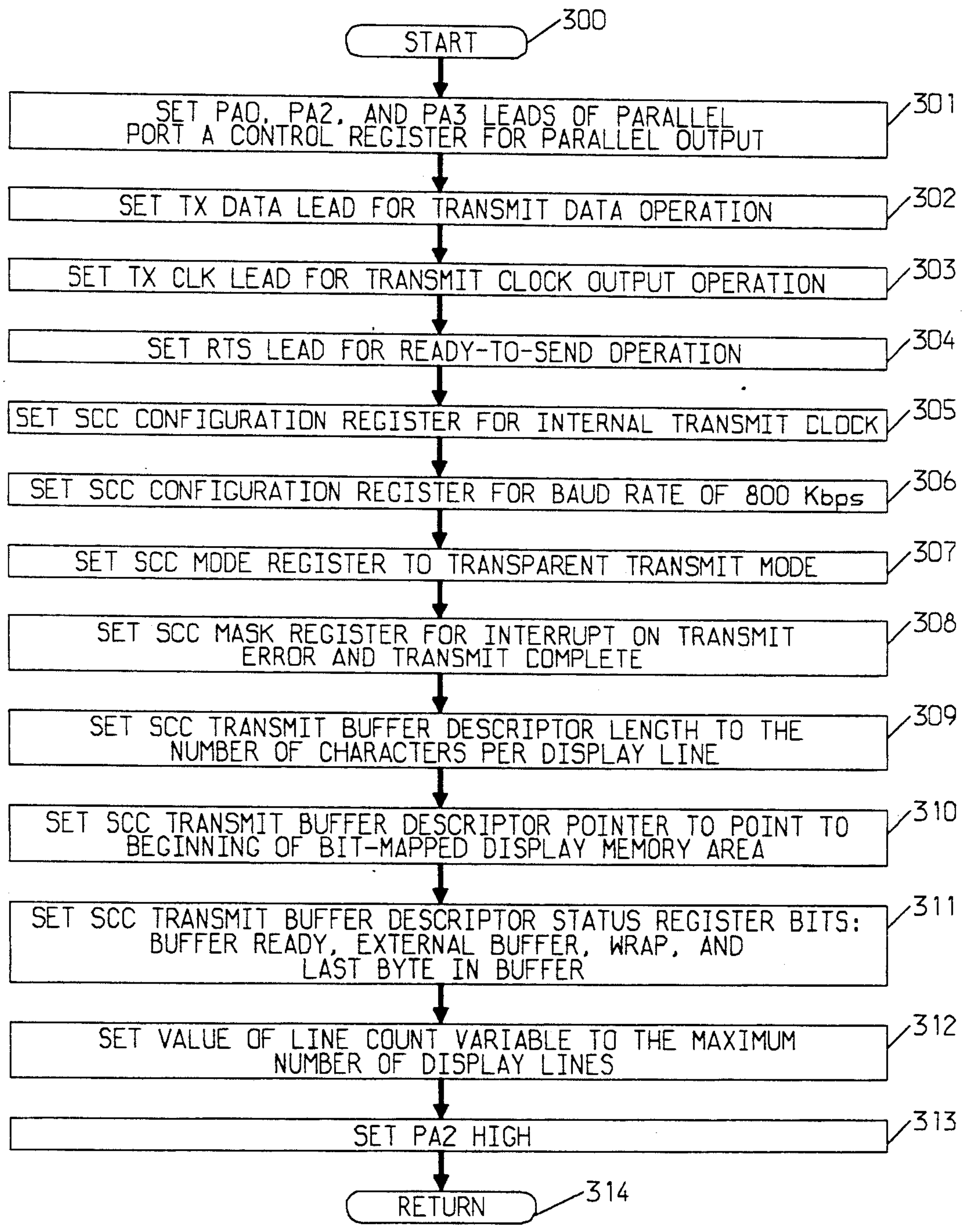
FIG. 3 is a flow diagram of operations of the microprocessor of the terminal of FIG. 1 in initializing the serial controller of FIG. 2.

FIG. 3 shows the controller 3 initialization routine 30. Upon invocation of routine 30, at step 300, microprocessor 15 programs leads 210–212 for parallel output, at step 301, by programming a parallel port A control register of microcontroller 14. Microprocessor 15 also programs lead 215 for transmit data operation, at step 302; programs lead 214 for transmit clock output operation, at step 303; and programs lead 213 for EIA ready-to-send operation, at step 304. Microprocessor 15 also programs an SCC configuration register of controller 3 for internal transmit clock, at step 305, and to set the baud rate at 800 Kbps, at step 306. Microprocessor 15 programs an SCC mode register of controller 3 for transparent transmit mode, at step 307. Microprocessor 15 further programs an SCC mask register of controller 3 for interrupt on transmit error and on transmit complete, at step 308. Microprocessor 15 next programs an SCC transmit buffer descriptor length to the number of characters per line of display 22, at step 309. In this example, the number of characters per line is the number of bits per line of display 22 divided by eight. Microprocessor 15 further programs an SCC transmit buffer descriptor pointer of controller 3 to point the beginning of a bit-mapped area of RAM 12 that represents display 22, at step 310. Microprocessor 15 also programs an SCC transmit buffer descriptor status register of controller 3 to set therein the following bits: buffer ready, external buffer, wrap (i.e., final buffer), and last byte in buffer, at step 311. Microprocessor 15 then sets the value of a line count variable in RAM 12 to the maximum number of lines in display 22—64 in this example—, at step 312. Finally, microprocessor 15 sets signal PA2 high, at step 313, and then returns to the point of invocation of routine 30, at step 314.

In response to being initialized, controller 3 sets RTS signal lead 213 high, and starts outputting T×CLK signals and unformatted idle T×DATA signals on leads 214 and 215, respectively, at the programmed baud rate of 800 Kbps. At the same time, in response to the buffer ready bit of the SCC transmit buffer descriptor status register being set, controller 3 makes DMA accesses to the area of RAM 12 that is pointed to by the SCC transmit buffer descriptor pointer, to retrieve therefrom, a byte at a time, a block of data equal in length to the programmed SCC transmit buffer descriptor length. Upon retrieving a byte of data, controller 3 sets RTS signal lead 213 low and starts outputting the retrieved data on T×DATA line 215, in unformatted serial form. When it has completed outputting the block of data on T×DATA line 215, controller 3 sets RTS signal lead 213 high, resumes transmitting idle data on T×DATA line 215, and generates a transmit complete interrupt to microprocessor 15, by setting the transmit complete bit of the SCC event register. Detection of any error during its transmit operation causes controller 3 to issue a transmit error interrupt to microprocessor 15, by setting the transmit error bit of the SCC event register.

Setting of PA2 signal line 211 high at step 313 sends an S (V SYNC) signal to display 22 and causes it to get ready to display a new frame 220. but because the RTS lead 213 is initially high, display 22 receives no CP2 signals on link 216, and hence it ignores the incoming idle data on D link 215. Change of the RTS signal from high to low causes display 22 to receive CP2 signals on link 216. In response, display 22 receives the accompanying display data signals on link 215 and displays them, bit-by-bit, on a line 221—in this case the initial line—of a display frame 220. When the RTS signal goes high again, display 22 stops receiving CP2 signals and in response resumes ignoring incoming data on link 215.

Figure 4:
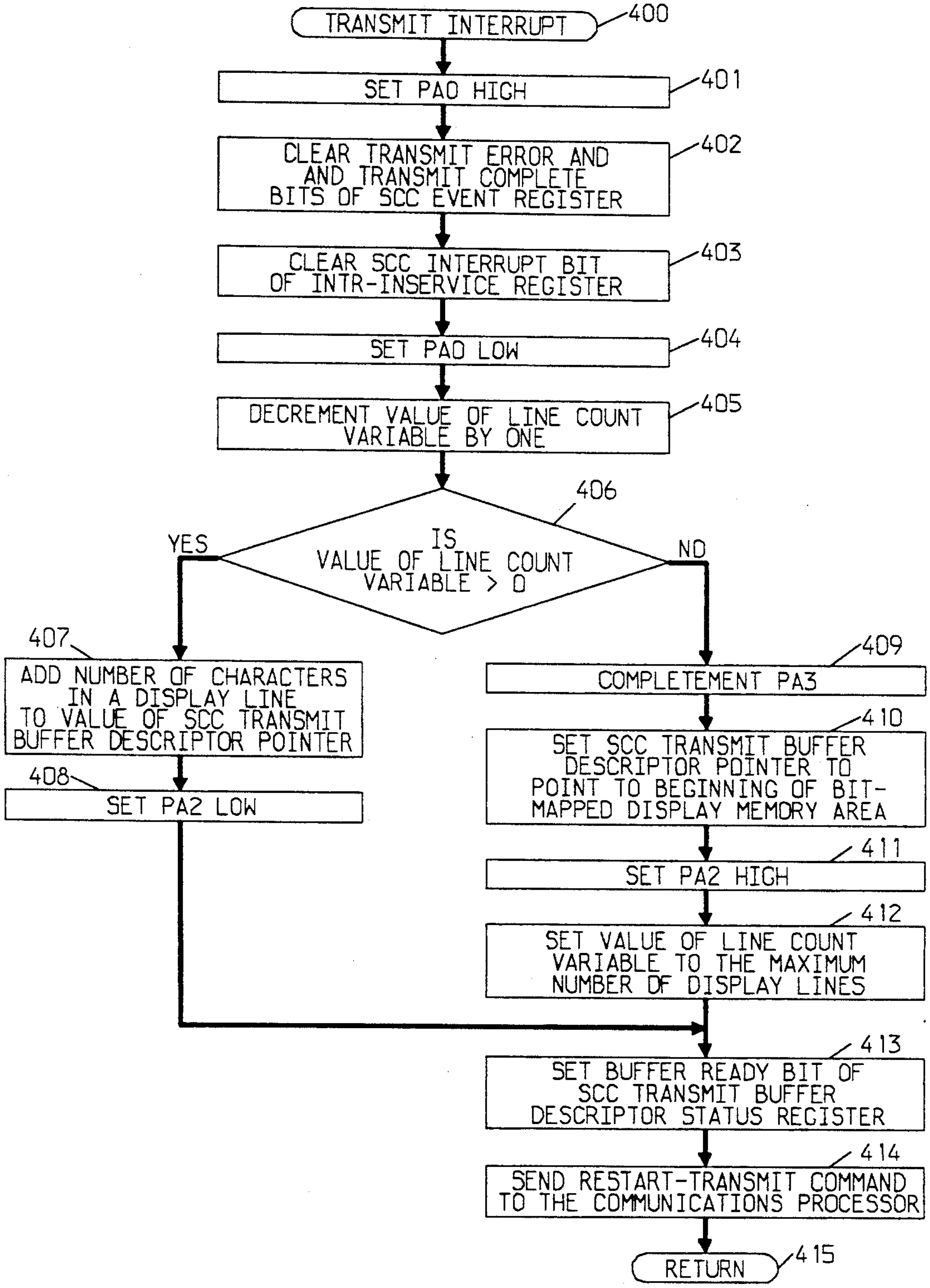
FIG. 4 is a flow diagram of operations of the microprocessor of the terminal of FIG. 1 in controlling the serial controller of FIG. 2.

The transmit-error or transmit-complete interrupt generated by controller 3 during or following its transmission of a line of display frame data causes microprocessor 15 to execute interrupt service routine 31 of FIG. 4. Following the invocation of routine 31 by the interrupt, at step 400, microprocessor 15 sets PA0 signal lead 212 high, at step 401, to issue an H SYNC signal to display 22; clears transmit error and transmit complete bits of the SCC event register, at step 402, to re-enable these interrupts; clears the SCC interrupt bit of its intr-inservice register, at step 403, to re-enable interrupts; clears PA0 signal lead 512, at step 404, to cease generation of the H SYNC signal; and decrements the previously-mentioned line-count variable, at step 405, to record that transmission of a line of a display frame has been completed. Microprocessor 15 then checks whether the value of the line-count variable exceeds 0, at step 406. If so, it means that a full display frame 220 has not been transmitted yet, so microprocessor 15 adds the number of characters in a display line 221, a constant, to the value of the SCC transmit buffer descriptor pointer, at step 407, to cause the pointer to point to the beginning of the next display line in RAM 12. Microprocessor 15 also sets PA2 signal lead 212 low, at step 408, to cease generation of the V SYNC signal.

Returning to step 406, if the value of the line-count variable has been decremented to zero, it means that a full display frame 220 has been transmitted to display 22. Microprocessor therefore complements the signal value of PA3 signal lead 210, at step 409, to toggle the value of signal M; sets the SCC transmit buffer descriptor pointer of controller 3 to point back to the beginning of the bit-mapped area of RAM 12 that represents display 22, at step 410; sets PA2 signal lead 512 high, at step 411, to issue a V SYNC signal to display 22 and thereby indicate to display 22 that the next transmitted data is the display data for the first line 221 of a new display frame 220; and finally resets the value of the line-count variable in RAM 12 to the maximum number of lines 221 in display 22, at step 412. It will be noted that the state of controller 3 following step 412 is the same as it was following initialization (FIG. 3).

Following step 408 or 412, microprocessor 15 sets the buffer ready bit of the SCC transmit buffer descriptor status register, at step 413, to signal controller 3 to proceed with transmission of the next display line 221. Microprocessor 15 then also sends a restart-transmit command to communications processor 202, at step 414, to restart processor 202 in case it had been a transmit error interrupt that had caused execution of the routine of FIG. 4. Microprocessor 15 then returns to the point of invocation of the routine 31, at step 415.

Controller 3 responds to each buffer ready signal in the manner described in conjunction with FIG. 3, and causes display 22 to respond correspondingly. Display 22 responds to each CP1 (H SYNC) signal by commencing display of received data signals D on a new—the next—line 221 of display frame 220. As mentioned previously, display 22 responds to each S (V SYNC) signal by getting ready to display a new frame 220 and displaying the next-received data signals D on the first line 221 of the new display frame 220.

In the illustrative example of terminal 10 of FIG. 1, microprocessor 15 receives a transmit complete interrupt approximately once every 250 microseconds, and takes about 25 microseconds to execute the routine of FIG. 4. Consequently, microprocessor 15 consumes about 10% of its time in causing controller 3 to perform the function of a display controller of display 22.

Of course, it should be understood that various changes and modifications may be made to the above-described illustrative embodiment of the invention. For example, the T×CLK output port of the controller may be a programmable port, caused to transmit clock signals only when the RTS signal is present, thereby eliminating the need for the RTS lead and the NOR gate. Or, a parallel communications controller can be used in place of the serial communications controller, by additionally programming a programmable timer thereof to generate the clock (T×CLK) signals and feeding the parallel controller's output to the display through a parallel-to-serial converter. Also, a single transfer by the controller may transfer a full frame of the image. Correspondingly, the display may be only a single-line display, that is, a frame of the display image may consist of only one image line. Such changes and modifications may be made without departing from the spirit and the scope of the invention. It is therefore intended that such changes and modifications be covered by the following claims.

I claim:

1. A display arrangement comprising:

memory means for storing data representative of an image to be displayed;

a display;

a DMA or communications controller interconnecting the memory means and the display and supplying the data from the memory means directly to the display instead of a display controller; and a programmable processor connected to the DMA or communications controller and programmed to comprise means for repeatedly causing the DMA or communications controller to transfer the data from the memory means to the display, and means for repeatedly generating control signals including display synchronization signals to cause the display to display the image represented by the transferred data.

2. The display arrangement of claim 1 wherein the control signals generated by the generating means of the processor comprise horizontal and vertical sync signals.

3. The display arrangement of claim 1 wherein the causing means of the programmable processor repeatedly sends a command to the DMA or communications controller, and the DMA or communications controller responds to each command received from the processor by once transferring to the display a predetermined amount of data from the memory means.

4. The display arrangement of claim 3 wherein the predetermined amount of data represents one line of the image.

5. The display arrangement of claim 3 wherein the predetermined amount of data represents one frame of the image.

6. A display arrangement comprising:
memory means for storing data representative of an image to be displayed;
a display;
a DMA or communications controller interconnecting the memory means and the display instead of a display controller; and
a programmable processor connected to the DMA or communications controller and programmed to comprise
means for repeatedly sending a command to the DMA or communications controller to cause the DMA or communications controller to transfer the data from the memory means to the display, and
means for repeatedly generating control signals to cause the display to display the image represented by the transferred data; wherein
the DMA or communications controller responds to each command received from the processor by once transferring to the display a predetermined amount of data from the memory means,
the DMA or communications controller sends an interrupt to the processor following each transfer of the predetermined amount of data,
the generating means of the processor responds to receipt of each interrupt by generating a horizontal sync signal,
the causing means of the processor responds to receipt of each interrupt by sending the command to the DMA or communications controller, and
the generating means of the processor further responds to receipt of each Nth interrupt, where N is a number of lines in a frame of the image, by generating a vertical sync signal.

7. A display arrangement comprising:
memory means for storing data representative of an image to be displayed;
a display;
a DMA or communications controller interconnecting the memory means and the display instead of a display controller; and
a programmable processor connected to the DMA or communications controller and programmed to comprise
means for repeatedly causing the DMA or communications controller to transfer the data from the memory means to the display, and
means for repeatedly generating control signals to cause the display to display the image represented by the transferred data; wherein
the memory means store data representing a line of the image to be displayed on the display;
the DMA or communications controller comprises
means for retrieving data from the memory means,
a first output port connected to the retrieving means for transmitting the retrieved data as a bit-serial data stream to a data input port of the display,
a second output port for transmitting a bit-clock signal stream to a clock input port of the display in parallel with the bit serial data stream when retrieved data are being transmitted at the first output port, and
a third output port for transmitting a signal to a sync input port of the display;
the causing means of the programmable processor cause the DMA or communications controller to periodically retrieve from memory and transmit at the first output port data representing a line of the image frame; and
the generating means of the programmable processor transmit a signal at the third port following each transmission by the first port of data representing a line of the image.

8. The display arrangement of claim 7 wherein the DMA or communications controller further comprises
means for issuing an interrupt to the processor following each transmittal at the first output port of data representing a line of the image; and
the causing means of the processor cause the DMA or communications controller to retrieve from memory and transmit at the first output port data representing a next line of the image, in response to receipt of each interrupt.

9. A display arrangement comprising:
memory means for storing data representative of an image to be displayed;
a display;
a DMA or communications controller interconnecting the memory means and the display instead of a display controller; and
a programmable processor connected to the DMA or communications controller and programmed to comprise
means for repeatedly causing the DMA or communications controller to transfer the data from the memory means to the display, and
means for repeatedly generating control signals to cause the display to display the image represented by the transferred data; wherein
the memory means store data representing lines of an image frame to be displayed on the display;
the DMA or communications controller comprises
means for retrieving data from the memory means,
a first output port connected to the retrieving means for transmitting the retrieved data as a bit-serial data stream to a data input port of the display,
a second output port for transmitting a bit-clock signal stream to a clock input port of the display in parallel with the bit serial data stream when retrieved data are being transmitted at the first output port, a third output port for transmitting a signal to a horizontal sync input port of the display, and a fourth output port for transmitting a signal to a vertical sync input port of the display;

the causing means of the programmable processor cause the DMA or communications controller to periodically retrieve from memory and transmit at the first port data representing a line of the image frame; and the generating means of the programmable processor transmit a horizontal sync signal at the third port following each transmission by the first port of data representing a line of the image frame, and transmit a vertical sync signal at the fourth port following transmission by the first port of data representing a last line of the image frame.

10. The display arrangement of claim 9 wherein the DMA or communications controller further comprises means for issuing an interrupt to the processor following each transmittal at the first output port of data representing a line of the image frame, and the causing means of the processor cause the DMA or communications controller to retrieve from memory and transmit at the first output port data representing a next line of the image frame, in response to receipt of each interrupt.

11. A display controller comprising:

a DMA or communications controller responsive to each first command received from a processor by once transferring from a memory to a display a predetermined amount of data representing at least one line of an image to be displayed on the display, and for issuing an interrupt following each transfer of the predetermined amount of data; and a programmable processor connected to the DMA or communications controller and programmed to comprise means for sending one first command to the DMA or communications controller and thereafter responsive to receipt of each interrupt for sending a next first command to the DMA or communications controller, and means responsive to receipt of each interrupt for generating a sync signal for the display, to cause the display to display the image represented by the transferred data.

12. The controller of claim 11 wherein the DMA or communications controller is responsive to each first command by once transferring from the memory to the display a predetermined amount of data representing a line of a frame of the image to be displayed on the display, and the generating means of the processor respond to receipt of each interrupt by generating a horizontal sync signal for the display, the sending means of the processor respond to receipt of each interrupt by sending the next first command to the DMA or communications controller, and the generating means of the processor further respond to receipt of every Nth interrupt, where N is the number of the lines in one said frame of the image, by generating a vertical sync signal for the display.

13. A display controller comprising:

a DMA or communications controller including means for retrieving data from a memory that stores data representing at least one line of an image to be displayed on a display, a first output port connected to the retrieving means for transmitting the retrieved data as a bit-serial data stream to a data input port of the display, a second output port for transmitting a bit-clock signal stream to a clock input port of the display in parallel with the bit-serial data stream when retrieved data are being transmitted at the first output port, and a third output port for transmitting a signal to a sync input port of the display; and a programmable processor connected to the DMA or communications controller and programmed to comprise means for causing the communications controller to periodically retrieve from memory and transmit at the first output port data representing the at least one line of the image, and means for transmitting a sync signal at the third port following each transmission by the first port of data representing the at least one line of the image.

14. The display controller of claim 13 wherein the means for retrieving comprise means for retrieving data from a memory that stores data representing lines of an image frame to be displayed on a display;

the DMA or communications controller further includes a fourth output port for transmitting a signal to a vertical sync input port of the display; and the causing means of the processor cause the communications controller to periodically retrieve from memory and transmit at the first output port data representing a line of the image frame, and the transmitting means of the processor transmit a horizontal sync signal at the third port following each transmission by the first port of data representing a line of the image frame, and cause the fourth port to transmit a vertical sync signal following transmissions by the first port of data representing a last line of the image frame.

15. The display controller of claim 14 wherein the communications controller further includes a fifth output port for transmitting a signal to an alternating signal input port of the display; and wherein the programmable processor is further programmed to comprise means for causing the fifth port to transmit a signal, and to invert the signal being transmitted following transmissions by the first port of data representing the last line of the image frame.

16. The display controller of claim 13 wherein the first output port is operable in transparent mode for transmitting the retrieved data as an unformatted bit-serial data stream.

17. The display controller of claim 13 wherein the second output port comprises:

a fourth output port for transmitting a bit-clock signal stream in parallel with the bit-serial data stream transmitted at the first output port;

a fifth output port for transmitting a ready-to-send signal when retrieved data are being transmitted at the first output port; and gating means having input ports connected to the fourth and fifth output ports and having the second output port, for receiving the bit-clock signal stream from the fourth output port and transmitting the received signal stream at the second output port only when it receives the ready-to-send signal from the fifth output port.

18. The display controller of claim 17 wherein the gating means comprise:

nor-function means having input ports connected to the fourth and fifth output ports and having the second output port, for receiving the bit-clock signal stream from the fourth output port, inverting the received signal stream, and transmitting the inverted signal stream at the second output port only when it receives the ready-to-send signal from the fifth output port.

19. The display controller of claim 13 wherein the communications controller includes means for indicating that transmission of data retrieved from memory has been completed; and the causing means of the programmable processor cause the controller to retrieve from memory and transmit at the first output port data representing a next line of the image frame, in response to indication of transmission completion by the indicating means.

20. The display controller of claim 13 wherein the communications controller is a direct-memory-access serial-communications controller.

21. A user telecommunications terminal comprising:

means for providing telecommunications functions, including means for communicating with a user;

means for interfacing the providing means to a telecommunications link; a display;

memory means for storing data representative of an image to be displayed on the display;

a DMA or communications controller interconnecting the memory means and the display and supplying the data from the memory means directly to the display instead of a display controller; and a programmable processor connected to the DMA or communications controller and operatively coupled to the providing means and to the interface means and programmed to comprise means for controlling the providing means and the interface means to effect transfer of communications between the user and the telecommunications link, means for repeatedly causing the DMA or communications controller to transfer the data from the memory means to the display, and means for repeatedly generating control signals including display synchronization signals to cause the display to display the image represented by the transferred data.

22. The terminal of claim 21 wherein:

the control signals generated by the generating means of the processor comprise horizontal and vertical sync signals.

23. A user telecommunications terminal comprising:

means for providing telecommunications functions, including means for communicating with a user;

means for interfacing the providing means to a telecommunications link;

a display;

memory means for storing data representative of an image to be displayed on the display;

a DMA or communications controller interconnecting the memory means and the display instead of a display controller; and a programmable processor connected to the DMA or communications controller and operatively coupled to the providing means and to the interface means and programmed to comprise means for controlling the providing means and the interface means to effect transfer of communications between the user and the telecommunications link, means for repeatedly causing the DMA or communications controller to transfer the data from the memory means to the display, and means for repeatedly generating control signals to cause the display to display the image represented by the transferred data, wherein:

the causing means of the programmable processor sends a command to the DMA or communications controller;

the DMA or communications controller responds to each command received from the processor by once transferring from the memory means to the display an amount of data representing one line of the image, and sends an interrupt to the processor following each transfer of the amount of data representing one line;

the generating means of the processor responds to receipt of each interrupt by generating a horizontal sync signal;

the causing means of the processor responds to receipt of each interrupt by again sending the command to the DMA or communications controller; and the generating means of the processor further responds to receipt of each Nth interrupt, where N is a number of lines in a frame of the image, by generating a vertical sync signal.

* * * * *